(12) United States Patent
Regester

(10) Patent No.: US 7,086,746 B2
(45) Date of Patent: Aug. 8, 2006

(54) LIGHT WITH FLEXIBLE REFLECTOR AND CLEAR SUPPORT

(76) Inventor: Gary Regester, P.O. Box 9, Silver Plume, CO (US) 80476

( * ) Notice: Subject to any disclaimer, the term of this patent is extended or adjusted under 35 U.S.C. 154(b) by 53 days.

(21) Appl. No.: 10/872,911

(22) Filed: Jun. 21, 2004

(65) Prior Publication Data

US 2005/0281017 A1    Dec. 22, 2005

(51) Int. Cl.
*G03B 15/021* (2006.01)
(52) U.S. Cl. ............ 362/18; 362/16; 362/278; 362/320; 362/352; 362/450
(58) Field of Classification Search ............ 362/16–18, 362/396, 352, 355–357, 278, 320, 341, 450
See application file for complete search history.

(56) References Cited

U.S. PATENT DOCUMENTS

| | | | | |
|---|---|---|---|---|
| 2,962,825 A | * | 12/1960 | Bravo et al. ........... | 40/367 |
| 4,490,776 A | * | 12/1984 | Kluch ................... | 362/16 |
| 5,651,602 A | * | 7/1997 | Tawil et al. ............ | 362/18 |
| 6,106,125 A | * | 8/2000 | Finn et al. ............. | 362/11 |
| 6,519,089 B1 | * | 2/2003 | Graham ................. | 359/599 |

\* cited by examiner

*Primary Examiner*—Alan Cariaso
*Assistant Examiner*—James W Cranson, Jr.
(74) *Attorney, Agent, or Firm*—Notaro & Michalos PC

(57) ABSTRACT

A collapsible light has a flexible reflector or light modifying panel assembly forming a curved, e.g. parabola, or bent, e.g. angular, shape when in a use position. The light modifying panel assembly can be folded or flattened into a storage position. A further transparent or translucent panel may be provided across the front of the light modifying panel assembly. One or more lamps are support on the light modifying panel assembly by a transparent or translucent support panel assembly connected at at least two spaced apart locations to the light modifying assembly. The further panel may be a diffuser panel or other effects panel removably fastened across the front of the light modifying panel assembly. Several of the lights may be joined together to form arrays.

25 Claims, 15 Drawing Sheets

LIGHT WITH FLEXIBLE REFLECTOR AND CLEAR SUPPORT

FIELD AND BACKGROUND OF THE INVENTION

The present invention relates generally to the field of lighting and in particular to a new and useful light having a flexible reflector and diffuser for relatively flat storage and easy setup. The light is particularly useful for photographers and videographers of all skill levels. The light is modular as well and can be combined with other lights to create larger lighting arrays. Other areas of use for the invention are furniture or architectural lighting, motion pictures or cinema, task lighting, Internet web use, digital capture, videoconferencing, make-up lighting (e.g. lighting behind or near a mirror used for the application of cosmetics), or any other lighting need. The light of the invention can also be used to treat SAD or seasonal affective disorder by exposing a subject to light during a treatment known as "bright light" intervention.

Lights with reflectors and diffusers are generally known in the field of photographic or cinematic lighting. Such lights are used to illuminate an object or person whose image is being captured for different effects, including removing or creating shadows. When lights are used in a studio or stage setting, size and portability of the lights is not usually a concern, since often the lights will be moved by machines or fixed in place.

When photographing or filming on location, away from a studio or stage setting, the size, weight and portability of any equipment can be very important. This is especially true for professional photographers, amateur photographers and videographers alike, as they often must carry all their own equipment. These groups may want to have additional lighting available, but find it difficult to transport much equipment.

Lighting which produces softer, more distributed and diffuse light for illuminating subjects is presently more preferred by photographers and videographers. The structure needed to produce such lighting can often be heavy and bulky, since stands, reflectors and diffusers are all needed to support, direct and treat the light, in addition to the light source itself.

One of the most effective treatments for seasonal depression (SAD) is bright light therapy. People with seasonal depression benefit from daily exposure to bright light during the winter. Originally it was thought that special high-intensity light which mimicked the spectrum of sunlight was needed, but later studies demonstrated that high-intensity light works well even if it does not mimic sunlight. The most common treatment involves sitting in front of a bright fluorescent light from a "light box" for 30 minutes or so every day. This treatment has been proven to lift the moods of a majority of patients diagnosed with SAD.

Collapsible lights with diffusers are known in the art to assist photographers and videographers in their endeavors. For example, a portable light with a diffuser panel is disclosed in U.S. Pat. No. 6,176,598. The diffuser panel is connected over the end of an umbrella parabolic shade. Like other lights of this general type, the light is supported on a stand, as the parabolic shade is not adapted to independently support the light to shine horizontally otherwise.

Box lights with reflector panels and shades are known as well. But, these lights must also be supported on a stand, as they will fall over or tilt awkwardly if left to rest on the shade.

Also see U.S. Pat. Nos. 4,669,031 and 5,023,756 to the present inventor which disclose box lights that can be self supporting.

A light which is self-contained and portable, and can be positioned without need for a stand distinct from the reflector body and lamp is desirable.

SUMMARY OF THE INVENTION

It is an object of the present invention to provide a free-standing light primarily made from lightweight and flexible materials.

Yet another object of the invention is to provide a collapsible light which is easily assembled for use yet small for storage.

A further object of the invention is to provide a modular light which can be joined or oriented with others to form larger arrays of lights.

Accordingly, the light of the invention has a flexible first panel, which is a light modifying panel. A second panel, which is a transparent (clear) or translucent (clouded) lamp support sheet, is secured to the light modifying panel at one side or both sides, or may be detachable at the opposite side. In an embodiment of the invention, the detachable side of the lamp supporting sheet is held in a pocket formed on the corresponding side of the first panel. One or more lamps are supported on the lamp support sheet in front of a reflector. The first panel may be a transparent sheet that holds the lamps spaced from the front of the reflector. A mounting plate, for possible use on a stand, may be is fixed to the surface of the reflector and a lamp power cord passes through an opening in the plate.

The reflector is held in a parabolic curved shape by a pair of straps extending around the rear of the reflector in one embodiment of the invention, or may include one or more "living hinges" formed in the support sheet material. The straps, when present, are fastened by releasable buckles or other fasteners at the side of the reflector behind the pocket. When the reflector is in the parabolic shape with the transparent sheet across the front, it can stand unsupported on a horizontal surface. The reflector directs light from the lamp(s) held in the transparent sheet in the direction the reflector panel is facing. In another embodiment of the invention the support sheet with its living hinge(s) carries a reflective surface forming the reflector.

The reflector is changeable between its parabolic or angular use position and a flattened storage position by disconnecting the supporting straps and removing the free side of the transparent sheet from the pocket or by dismounting the lamps(s).

The reflector panel may include hook and loop type fasteners all around its perimeter. Translucent diffuser panels, other tinted panels or effects panels can all be secured to the fasteners via corresponding hook and loop or other fasteners, or may be fully or semi-permanently connected to the opposed edges of the reflective support panel.

Alternately, several of the lights may be joined together using the fasteners if some of the lights have one half of the hook and loop fastener and others of the lights have the complementary half, or by other fastening means.

In a further alternative, the reflector panel and/or the transparent sheet are shaped to make the light shine at an angle oblique to horizontal when the light is placed standing on a horizontal surface. In one embodiment, the reflector panel is made to have the bottom edge form a chevron. In another embodiment, the reflector panel and the transparent sheet together form a tilted volumetric shape having parallel front and rear surfaces.

A still further embodiment of the invention utilizes a three-ring binder type structure as a support frame for the device, with the light support and the light modifying panels having three holes, for example, for being easily and detachably engaged to the rings. A cover panel can be detachably connected across front edges of the covers of the binder to further modify the light.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
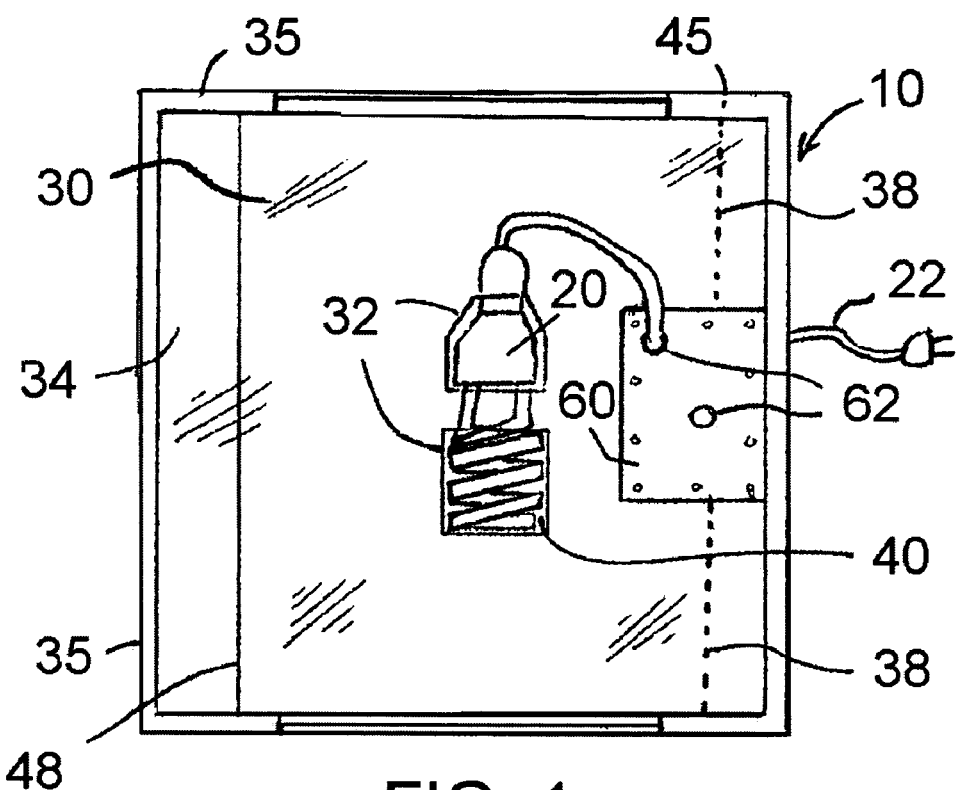
FIG. 1 is a front elevation of a light of the invention assembled for use.
Figure 2:
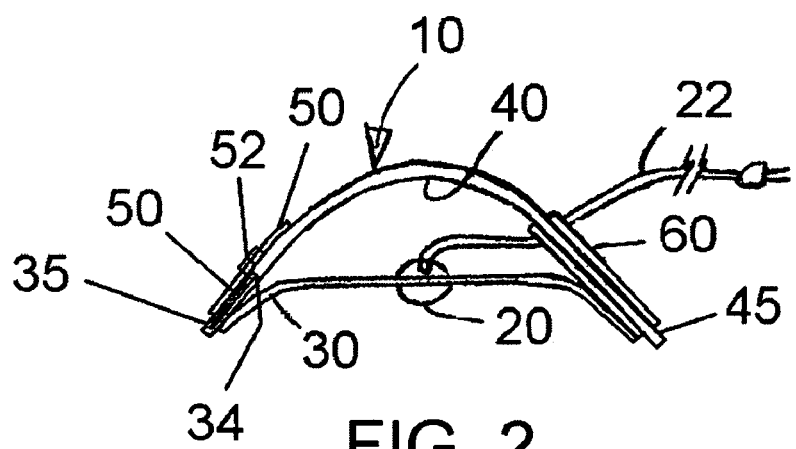
FIG. 2 is a top plan view of the light of FIG. 1.

Referring now to the drawings, in which like reference numerals are used to refer to the same or similar elements, FIGS. 1 and 2 show a light 10 in accordance with the invention assembled for use. A curved first, or light modifying panel 40 forms the rear of the light 10. A single lamp 20 is mounted to a transparent or translucent second panel 30. The second panel, or lamp support sheet 30, is mounted to the front of light modifying panel 40. The lamp support sheet 30 has a shorter width than the light modifying panel 40, so that second panel 30 spans the distance between the sides of the first panel 40 only when the first panel 40 is bent convex to the lamp support sheet 30 in the curved assembled position.

The light modifying panel 40 has a front surface preferably covered with a reflective material for directing light from the lamp 20 away from the front of the light modifying panel 40. The light modifying panel 40 is formed of a flexible material which is shaped into a curved, and preferably parabolic, reflector between its left and right sides around the lamp 20. The lamp 20 is supported in openings 32 through the lamp support sheet 30 at roughly the center of the parabola formed in the light modifying panel 40.

The lamp support sheet 30 is mounted at its sides to the light modifying panel 40 with one side secured to the light modifying panel 40 by lines of stitching or glue 38. Other similar means for securing the lamp support sheet 30 can be used as well, although it is preferred that the connection occupies as little surface of the light modifying panel 40 as possible.

In a preferred embodiment, the opposite side of the lamp support sheet 30 has a pocket 34 formed on the rear surface of the sheet 30. The side of the pocket 34 facing the lamp support sheet 30 has a reflective surface like that of light modifying panel 40. A tab 48 of the light modifying panel 40 is inserted into the pocket 34. The lamp support sheet 30 and pocket 34 are narrower than light modifying panel 40, so that when the tab 48 is inserted into the pocket 34, the light modifying panel 40 is forced into the curved shape. As noted above, preferably, the light modifying panel 40 forms a parabola, but it is envisioned that it may be curved into a shallow arc, a "W", a "V" or a "U" shape, among others.

The perimeter edges of light modifying panel 40 and pocket 34 are all lined with a hook and loop type fasteners 45, 35, respectively. The hook and loop type fasteners 35, 45 are preferably all the same half of the fastener on a single light 10. But, the fasteners 35, 45 may be alternated along the length of the respective pocket 34 or panel 40 sides, or two edges of the light 10 may be lined with one half of the fastener 35, 45 and the adjacent edges are lined with the other half of the fasteners 35, 45. When different fastener 35, 45 halves are used on a single light 10, many of the lights 10 can be joined together using the fasteners to form arrays. Alternatively, different effects panels, discussed further herein, with corresponding fasteners can be secured to the lined edges.

Mounting plates 60 are attached to the light modifying panel 40 on each surface. Aligned holes 62 are provided through the mounting plates 60 preferably for two purposes. One pair of aligned holes 62 is preferably for receiving one or more power cords 22 for lamps provided with the light 10, so that the power cords 22 can easily extend to the rear of the light 10 for connection with a power source, such as a wall outlet. Another of the aligned holes 62 can be used to secure the light 10 to a stand or other mount. An arm of the stand or mount is inserted though the holes 62 and a fastener is secured over the stand or mount arm to hold the light 10 in place. Alternatively, however, the power cord 22 may simply pass under one or both of the panels 30, 40.

Figure 3:
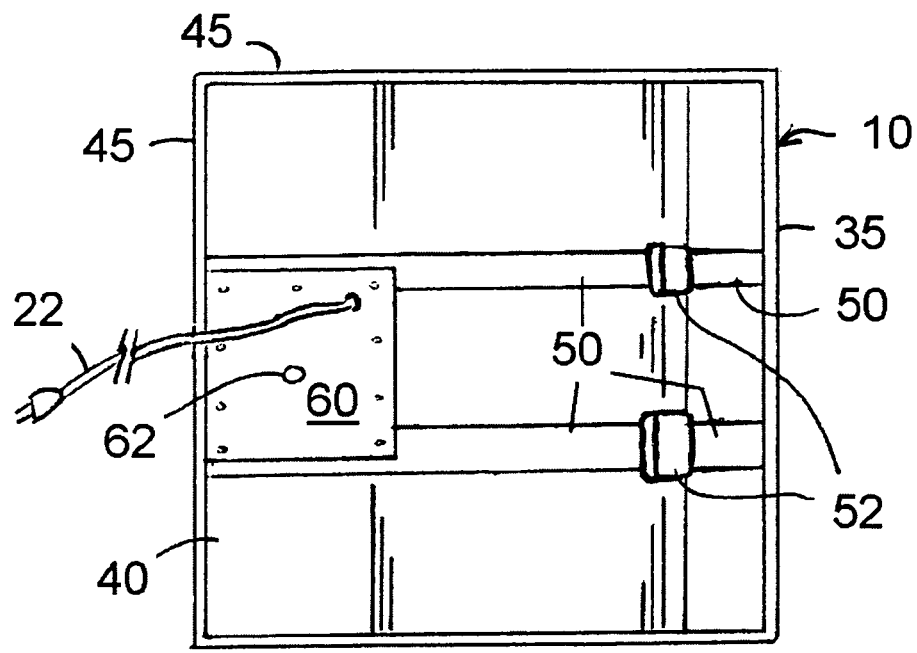
FIG. 3 is a rear elevation of the light of FIG. 1.

As shown in FIGS. 2 and 3, straps 50 with releasable buckles 52 are provided on the back of the light 10. The straps 50 and buckles 52 hold the light 10 in the assembled curved or concave shape (relative to the lamp support sheet 30) when tab 48 is inserted into pocket 34. Straps 50 are secured to the rear surface of each of the pocket 34 and light modifying panel 40. Mounting plate 60 may overlap the straps 50 on the light modifying panel 40 and help secure the straps 50.

The buckles 52 are preferably a quick-release type, such as ones with deformable tabs held in a channel, but may be formed as other types, including snap connectors, buttons and buttonholes, and hook and loop fasteners, among others. The buckles 52 must be sufficiently strong to resist coming unfastened while the light 10 is moved about, and as effects panels, such as described further herein, are attached or removed from the fasteners 35, 45 on the edges of the light 10. At the same time, a rapidly releaseable buckle 52 is preferred, so that the light 10 can be quickly disassembled with little effort.

Figure 4:
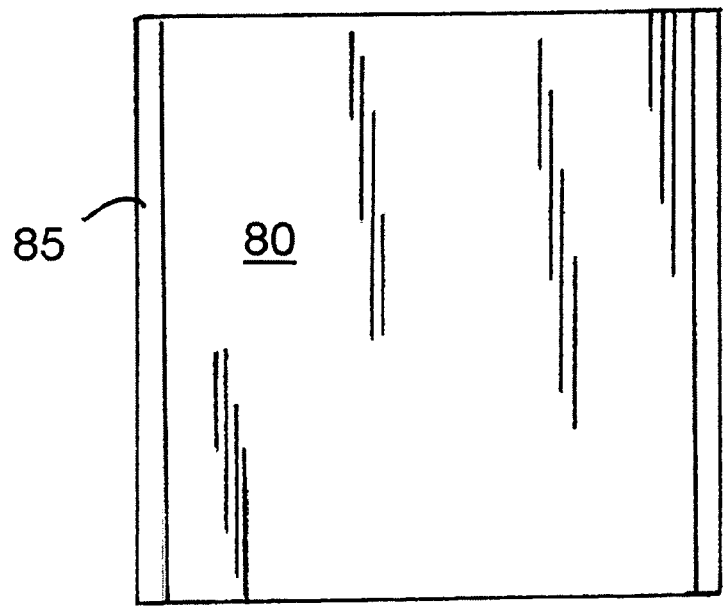
FIG. 4 is a front elevation of a diffuser panel for attaching to the light of FIG. 1.

FIG. 4 illustrates a diffuser panel 80 having hook and loop fasteners 85 corresponding to the fasteners 35, 45 on the pocket 34 and light modifying panel 40. The diffuser panel 80 is sized to extend between the left and right sides of the light 10 and cover the lamp support sheet 30. The light 10 is preferably oriented so that diffuser panel 80 is spaced slightly away from lamp 20 when it is secured to the fasteners 35, 45. The diffuser panel 80 can be translucent, colored, untinted, incorporate a diffusion pattern, or have a pattern of several colors. Diffuser panels 80 for the light 10 may be configured to provide any number of effects such as may be desirable to a photographer or videographer and can be provided by a detachable panel.

Figure 5:
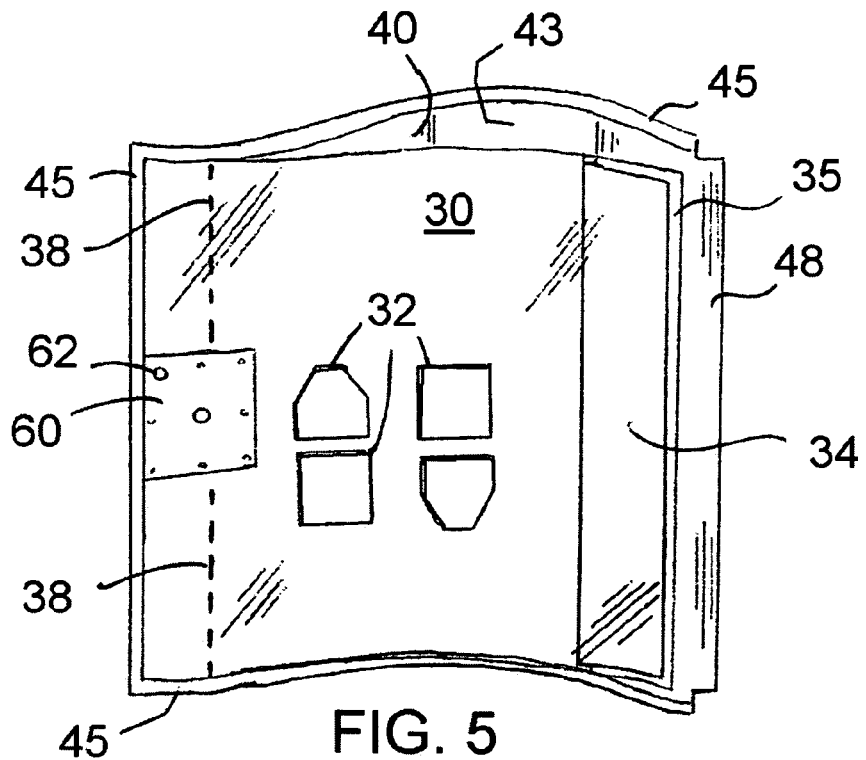
FIG. 5 is a top, front perspective view of the light disassembled for storage or transport.

FIG. 5 shows the light 10 partially disassembled, with the tab 48 removed from pocket 34. As can be seen, the light modifying panel 40 with the tab 48 is wider than the lamp support sheet 30, so that the tab 48 extends past the edge of the pocket 34 when disassembled. As noted above, light modifying panel 40 has a reflective material lining the front surface 43 facing the lamp support sheet 30.

As the light modifying panel 40 is flattened, the light 10 becomes nearly flat, except for lamps 20 in lamp support sheet 30. The light is easily stored or carried using a thin case, or can be rolled and carried, for example. Even more preferably, the lamps 20 are easily removed from lamp support sheet 30, further shrinking the space needed to store the collapsed light 10. The light 10 is easy to manipulate when it is disassembled.

In FIG. 5, the lamp support sheet 30 is illustrated with openings 32 for mounting a pair of lamps 20 (not shown). It should be understood that any number of lamps 20 and openings 32 may be provided with the light 10, limited only by the size of the lamps 20 and available area of the lamp support sheet 30. The lamps 20 are preferably low heat lamps, suitable for use with the lightweight plastic materials preferred for use with the light 10. For example, long-life fluorescent lightbulbs are good for use because they give off little or no heat and have good color temperature characteristics for photography.

Preferably, any lamps 20 included with the light 10 are arranged roughly centered on or around the centerline of the parabola formed by the light modifying panel 40. Further, the lamps 20 may be wired in series or parallel, so that only a single power cord 22 is required to power each lamp 20. Individual lamps 20 may have their own switch when they are wired in parallel or separately, and a single switch may be provided on the power cord 22 outside the light 10.

Further, the lamps 20 may be mounted to the sheet 30 other than through openings. It is preferred that any lamps 20 are releasably secured to the light support sheet 30, whether through openings or by other mountings, including using tie wraps or other wire fasteners, tape, string, or another fastener which is relatively heat resistant and as unobtrusive as possible to avoid blocking light from the lamp 20.

It should further be appreciated that the light modifying panel 40 and lamp support panel 30 may be connected in other ways than those described herein for the same effect. That is, for example, the tab 48 and pocket 34 may be replaced by a hook and loop fastener connection, by snap or zipper fasteners, and others which provide a releasable connection. Preferably, the releasable connector selected provides an easy connection as well.

Similarly, the fixed connection formed by stitching or glue 38 may also be replaced by a releasable connection of the same or different type than used on the side with the tab 48 and pocket 34. The same alternate releasable connections noted above can be used in place of the preferred fixed connection 38.

Figure 6:
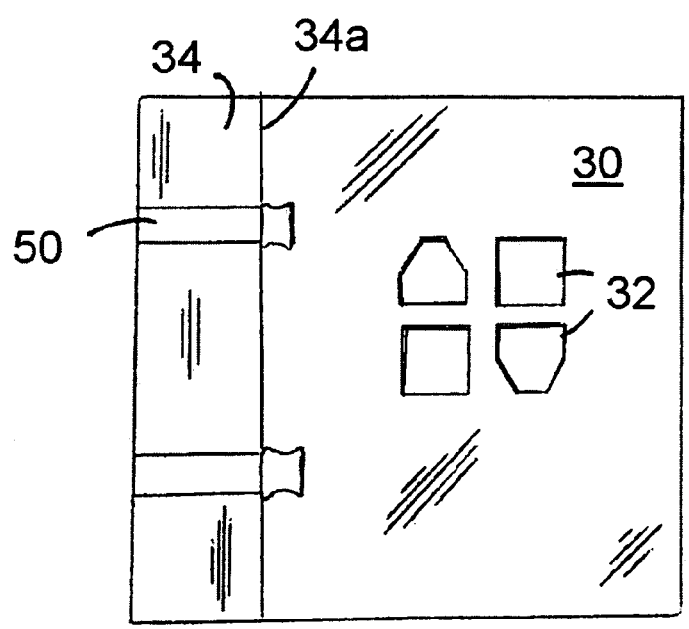
FIG. 6 is a rear elevation of the transparent sheet separated from the light.

The lamp support sheet 30 is displayed from the rear fully separated from the light modifying panel 40 in FIG. 6. Although the lamp support sheet 30 is preferably not fully detachable from the light modifying panel 40, this view is provided for a better understanding of the components of the light 10. As seen in FIG. 6, the pocket 34 has slot opening 34a for receiving the tab 48 of light modifying panel 40. Straps 50 and buckle halves 52 are preferably arranged so that the buckles 52 will fasten approximately behind the slot opening 34a. This fastening point helps shape the light modifying panel 40 properly.

The lamp support sheet 30 is preferably made from a flexible, yet durable, transparent plastic. Alternatively, the lamp support sheet 30 may instead be translucent, but otherwise have the same properties as the preferred transparent plastics. The light modifying panel 40 is preferably made of a vinyl, or similar material which is flexible, covered by a light modifying layer. The light modifying layer may be a reflective material such as foil or a silvered surface. Alternatively, the light modifying layer can have a different surface for providing other effects. In general, the use of plastic and other lightweight materials in combination with the simple construction contribute to making the light 10 very lightweight and easily portable.

Figure 7:
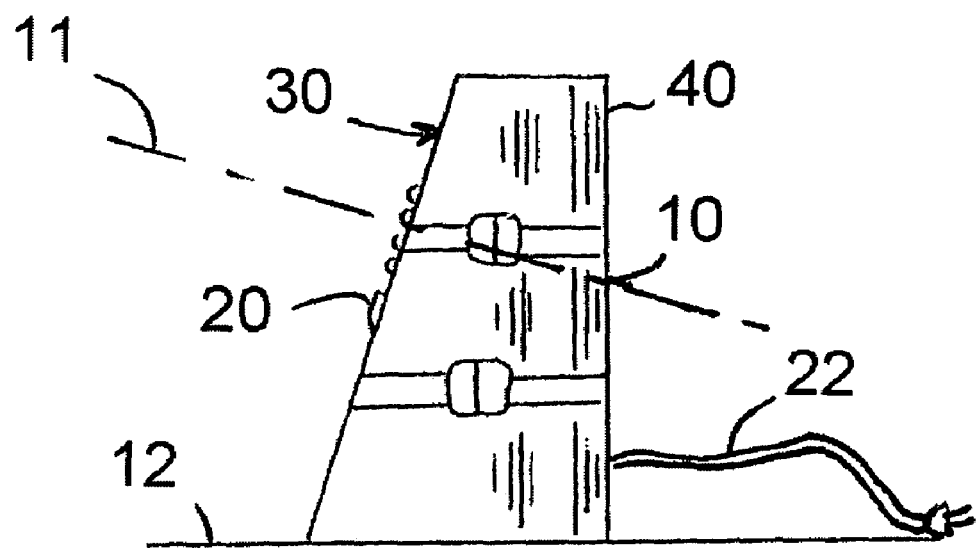
FIG. 7 is a side elevation of an alternate configuration of the light.
Figure 8:
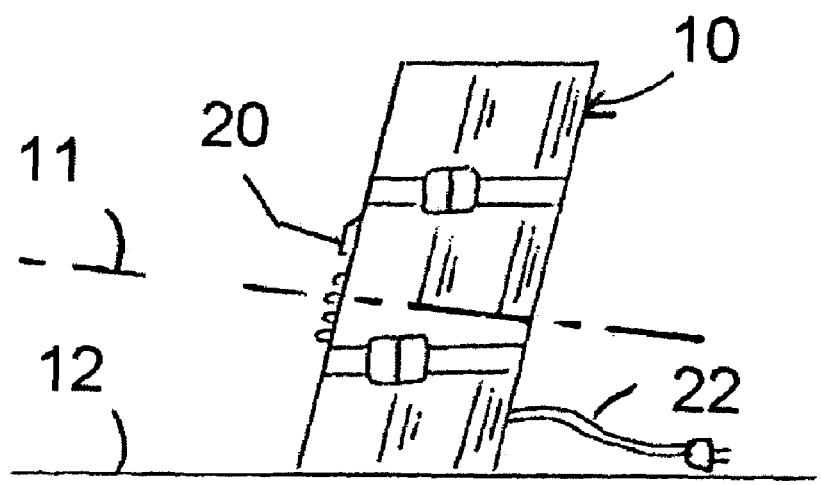
FIG. 8 is a side elevation of a third embodiment of the light.

FIGS. 7 and 8 illustrate two alternate embodiments of the light 10 in which the light modifying panel 40 is configured to tilt the axis 11 on which light is directed from the lamps 20 relative to the horizontal axis 12. As shown, the lamp support sheet 30 and side edges of light modifying panel 40 are made longer in FIG. 7 to cause the lamp 20 to be oriented obliquely to horizontal.

In FIG. 8, the light 10 has a tilted pitch to both the light modifying panel 40 and lamp support sheet 30 and lamp 20. As a result, the entire light 10 body is tilted backward.

It is important in each embodiment that the light 10 has at least three points which each touch the supporting surface, but which are not all three co-linear. That is, lines drawn between the minimum three supporting points should define a triangle. Preferably, the minimum three supporting points will be provided by the ends of the light modifying panel 40 and the center of the panel 40 farthest from the lamp support sheet 30. But, it is possible that the light modifying panel 40 can be formed planar and the lamp support sheet 30 bows outwardly away from the planar light modifying panel 40. In such case, at least one support point is provided by the bend of the lamp support sheet 30.

Further, while the light modifying panel 40 and lamp support sheet 30 are each illustrated as being generally rectangular, other shapes are acceptable which provide the same function and can be stood in the same manner. As will be appreciated, the light modifying panels in FIGS. 7 and 8 are necessarily not rectangular to provide the lamp 20 orientation displayed. And, as a further example, the lamp support sheet 30 may have rounded or pointed ends and the support sheet 30 formed as an ellipse or circle, among other shapes.

Alternative configurations for the lights 10 include those noted above, such as the ability to join multiple ones of the lights 10 together using the hook and loop fasteners 35, 45 in an array. The array may be linear or spatial, such as for illuminating several sides of an object being photographed or videographed. One or more of the lights 10 can be used in conjunction with separate reflectors, diffusers, other light sources, backgrounds or scenery to create effective lighting for photographs and videos.

The light 10 may contain one large lamp 20, several lamps 20 or many small lamps 20 to produce a particular lighting effect for particular situations. Effects panels such as diffuser panel 80 may be provided to produce any number of effects and adjust the quality of the light produced. Further, if the diffuser panels 80 are provided with hook and loop fasteners 85 on each surface, multiple panels 80 may be fastened over each other to one light 10, although the intensity of the light 10 is likely to diminish rapidly with each successive panel 80 used. Similarly, panels may be placed and secured over the top and bottom ends of the light 10 in the same manner, so that the light 10 can be used in different orientations.

In a preferred embodiment of the light 10, the lamps 20 used with the light are long-life fluorescent bulbs, because they are efficient and generate little wasted heat energy when used. But, conventional incandescent bulbs, neon or other excited gas bulbs, or halogen lamps can all be used with the light 10. Lamps 20 which produce excessive amounts of heat are not preferred to avoid damaging other components of the light 10.

In the previously disclosed embodiments, the first light modifying panel 40 cooperates with the second transparent or translucent panel 30 which also functions as lamp support means to support the lamp or lamps of the invention. In the following embodiments illustrated in FIGS. 9–16, the invention continues to include first and second light modifying panels which are spaced from each other in a use position of the light with at least one lamp held at least partly in this space. The lamps are supported by lamp support means of a different arrangement however. Further, the release means of the embodiments of FIGS. 1 to 8 in the form of the disengageable edges of the two panels, is replaced in the embodiments of FIGS. 9 to 16 with a different mechanism for releasing the panels and allowing them to collapse into a storage position where the panels extend substantially next to each other with little or no space therebetween and with the lamp or lamps removed (as is also the case for the previous embodiments).

Figure 9:
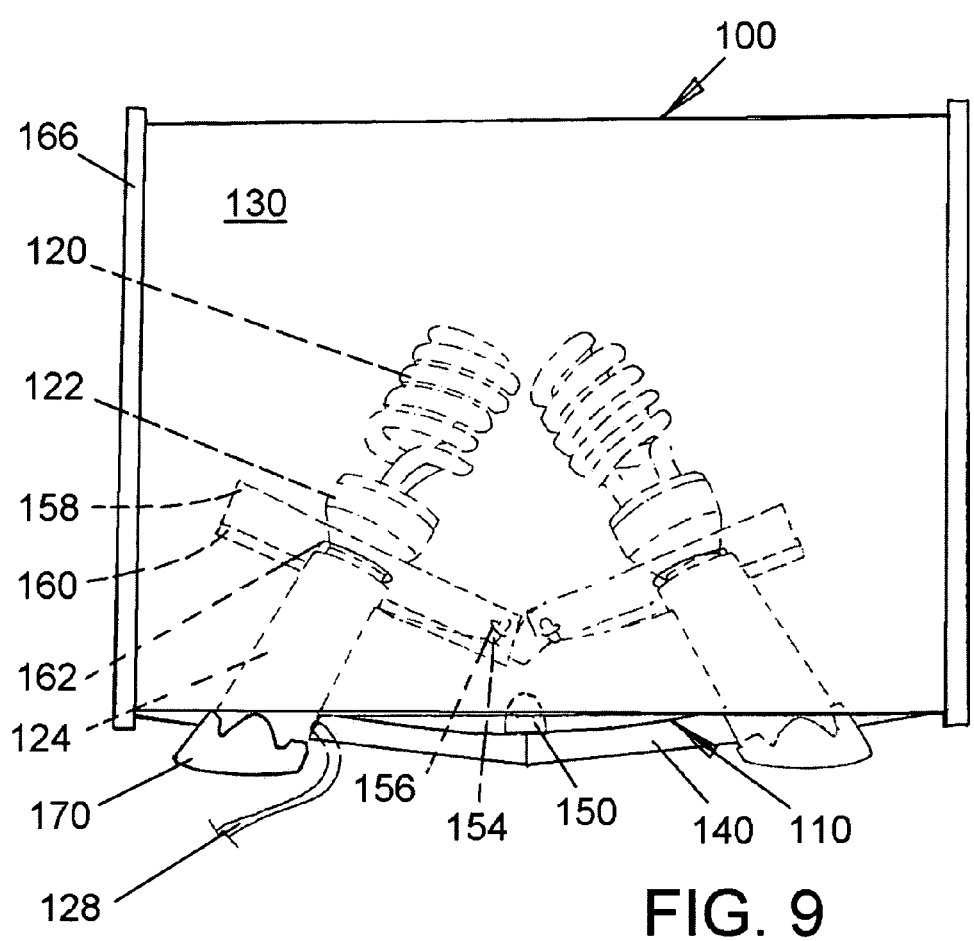
FIG. 9 is a front elevation of a still further embodiment of the light of the invention.

Turning to FIG. 9, this further embodiment of the invention comprises a light 100 having a rear or first light modifying panel 140 and a front or second light modifying panel 130 which is either transparent, translucent, white, tinted or of any other structure for passing light from a pair of fluorescent lamps 120 held in a lamp support assembly 110 in a space provided between the panels in a use position thereof.

Figure 10:
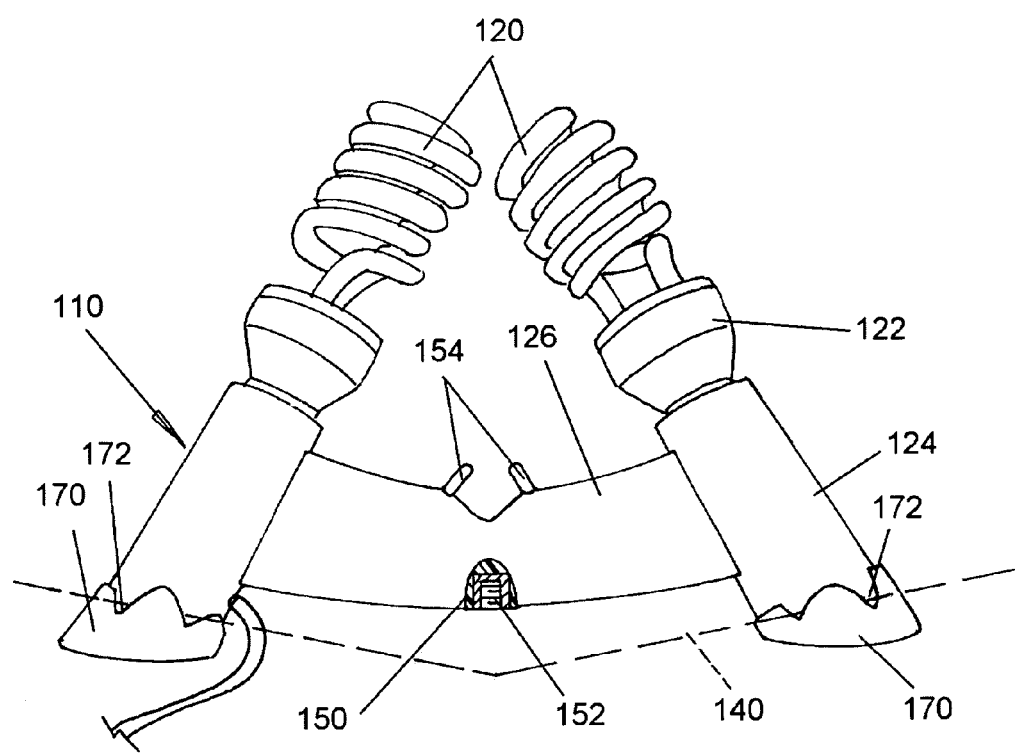
FIG. 10 is a front elevation of the lamp support assembly of the further embodiment of the invention.

FIG. 10 better illustrates the lamp support assembly 110 which carries a pair of lamps 120 which are preferably low heat and high efficiency fluorescent lamps having bases 122 which are screwed into sockets held in a pair of spaced apart socket portions 124 connected to each other by a curved support bridge 126. Internally, the socket portions 124, 124 are electrically connected to each other and are both supplied with electricity by a power cord 128 extending from one of the socket portions. Housed within a lower central enlargement 150 of the curved support 126 is a metal nut 152 which contains thread e.g., ¼ inch thread of a standard type which can be connected to a tripod or stand to support the entire light 100. A pair of upwardly and inwardly extending projections 154 are provided near the top center of curved support bridge 126. As shown in FIG. 9, each projection 154 extends into a hole 156 in respective clear support panels 158 which each have rear edges connected via a hinge 160 to the forward facing surface of first light modifying panel 140 which is advantageously provided with an inner reflective surface for reflecting light from the lamps 120, outwardly through second panel 130.

Figure 11:
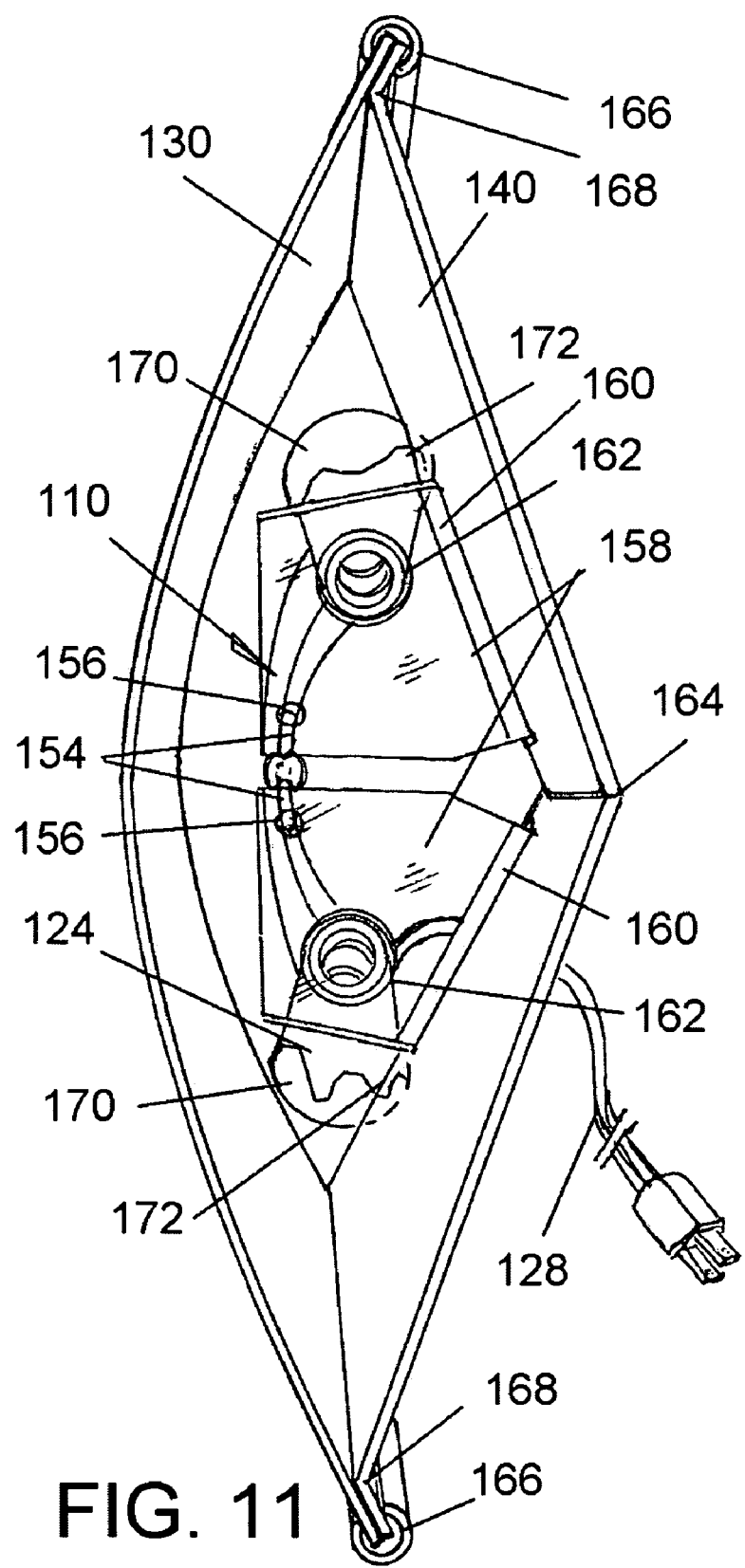
FIG. 11 is a top plan view of the further embodiment of the invention before the lamps are installed.
Figure 12:
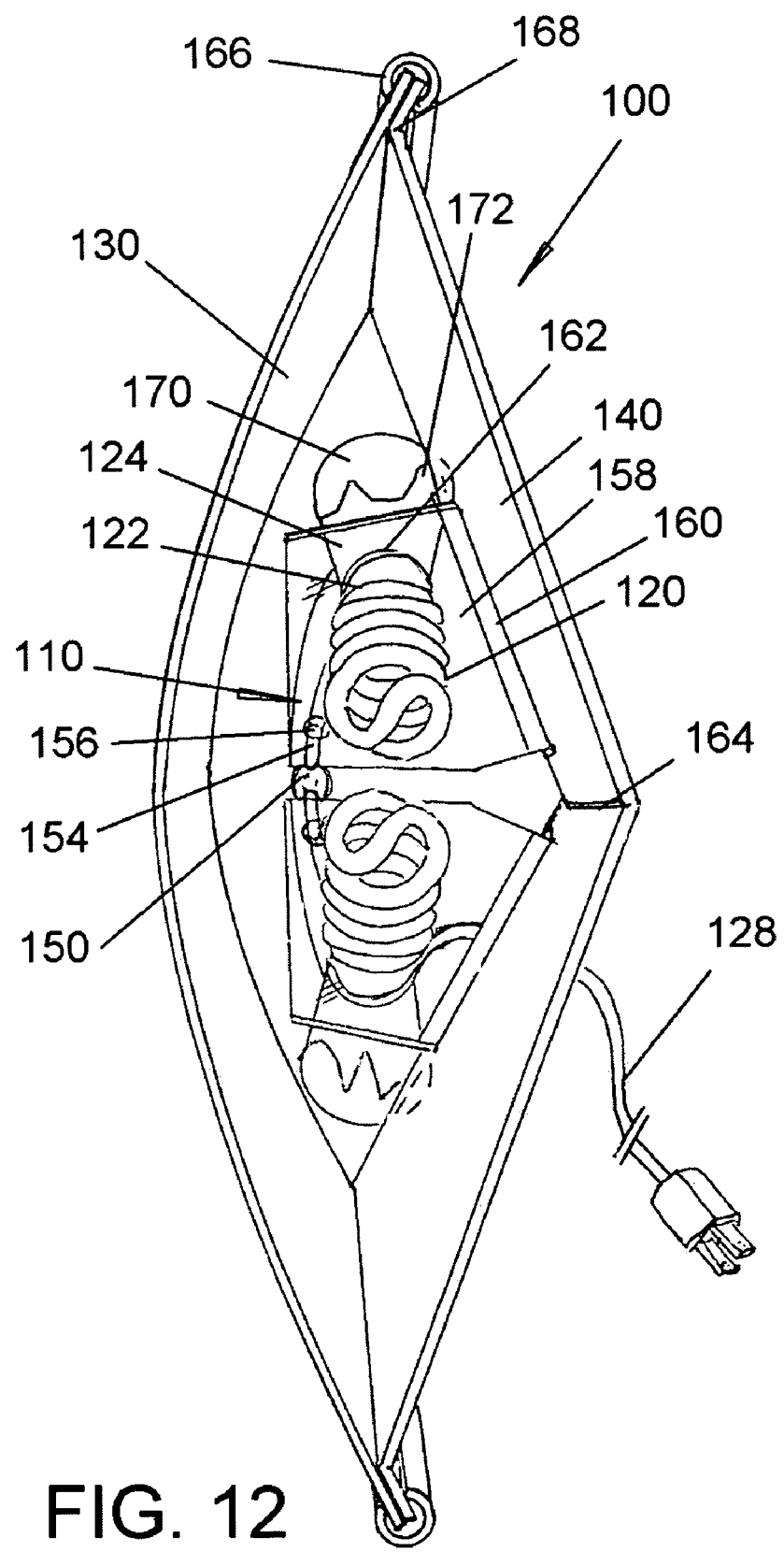
FIG. 12 is view similar to FIG. 11 but with the lamps installed.

Each of the support panels 158 also include a larger, more centrally located hole 162 through which the threaded portion of the lamp base 122 extends before it is screwed into the socket in its respective socket portion 124. As best shown in FIGS. 11 and 12, the position of panels 158, 158, extending angularly out from the inner surface of rear panel 140, and held in that position by projections 154 and the placement of lamps 120 through holes 162, fixes the angular position of panel 140 which is provided with a central living hinge 164. With the opposite sides of panels 140 and 130 held firmly against each other by a pair of split clamping tubes 166, which each have a C-shaped cross section and embrace the sides of the panels, the second or front transparent or translucent panel 130 takes on an arcuate shape shown in FIGS. 11 and 12. The interaction between the panels 130 and 140 is further enhanced by a pair of further living hinges 168 formed near the sides of panel 140 so that the edges at each side of each panel can lie parallel to each other and be effectively clamped by split tube 166. As is known, a "living hinge" is a weakening or scribing in an otherwise flexible material of panel 140 which produces a local hinge. The presence of the living hinges make panel 140 flexible into an angular use position and a flat storage position, and panel 130 is made of flexible material so that it could take on its arcuate shape and so that in the use position shown in FIGS. 11 and 12, a space is formed between the panels 140 and 130 by the lamp assembly 110. This use position is further held by the relationship and engagement with the support panels 158.

Another interaction which fixes the rear panel 140 in its angular position and forms part of the release means for this embodiment, is the fact that the lamp assembly 110 includes a pair of bottom caps 170 which are fixed to the socket portions 124 and which each include a scalloped slot area 172 into which a lower edge of panel 140 on opposite sides of the living hinge 164 is seated. This further fixes the angular use position of the rear panel 140 as shown in FIGS. 11 and 12.

Figure 17:
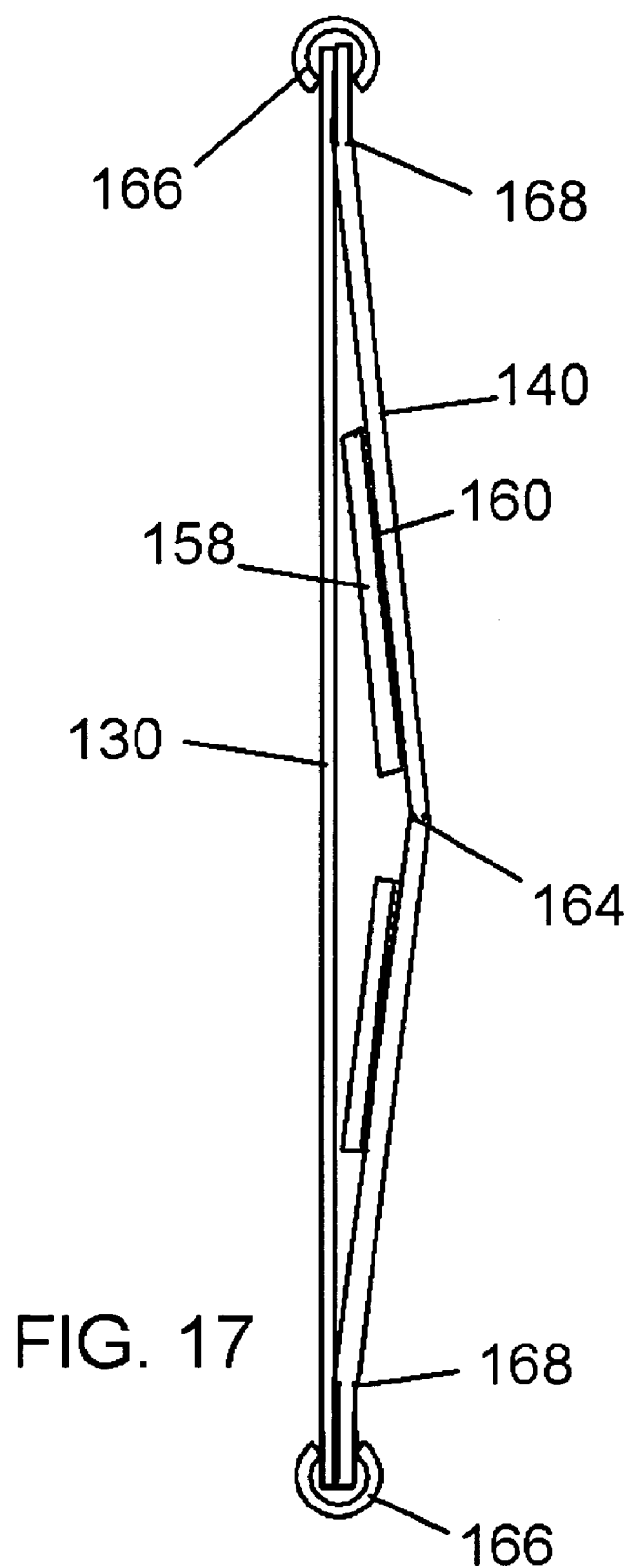
FIG. 17 is a top plan view of the storage position of the further embodiment.

FIG. 12 shows the lamps 120 installed in the lamp assembly 110 and in the use position of this embodiment. In the storage position, lamps 120 are removed as in FIG. 11, panels 158 are folded up on their hinges 160 so they lie substantially flat against the inner surface of panel 140 and the panels 130 and 140 lie flat against each other by virtue of the straightening of the panels and the opening of living hinges 160 and 168 as shown in FIG. 17.

Figure 13:
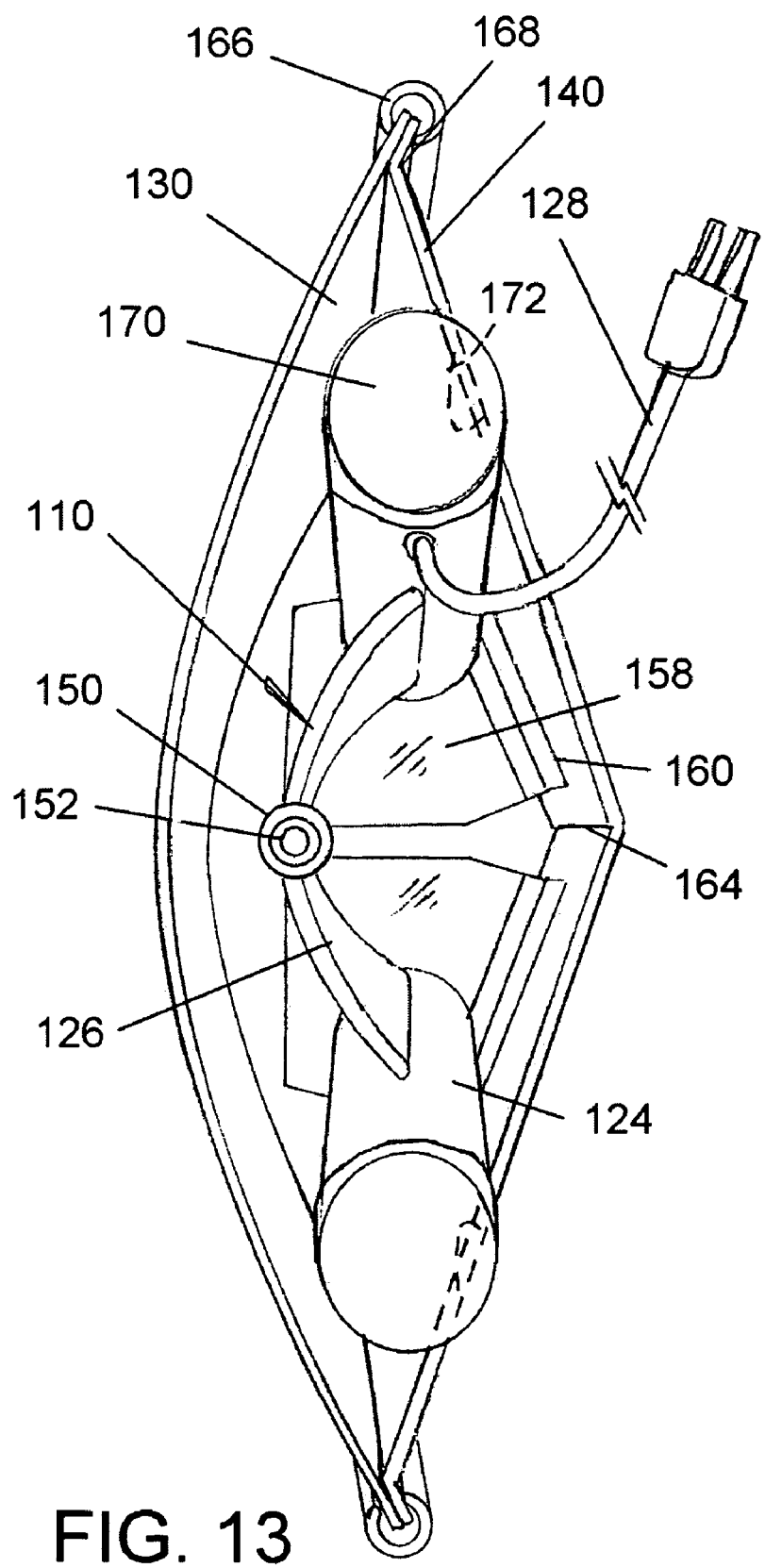
FIG. 13 is bottom plan view of the further embodiment of the invention shown without the lamps.

FIG. 13 is a bottom plan view of the embodiment of FIG. 11 which shows another angle for the support panels 158, the enlargement 150 for the threaded piece 152 and its stand hole and the engagement of the lower edge of panel 140 in the slots 172 formed in the end caps 170 of the lamp assembly 110.

Figure 14:
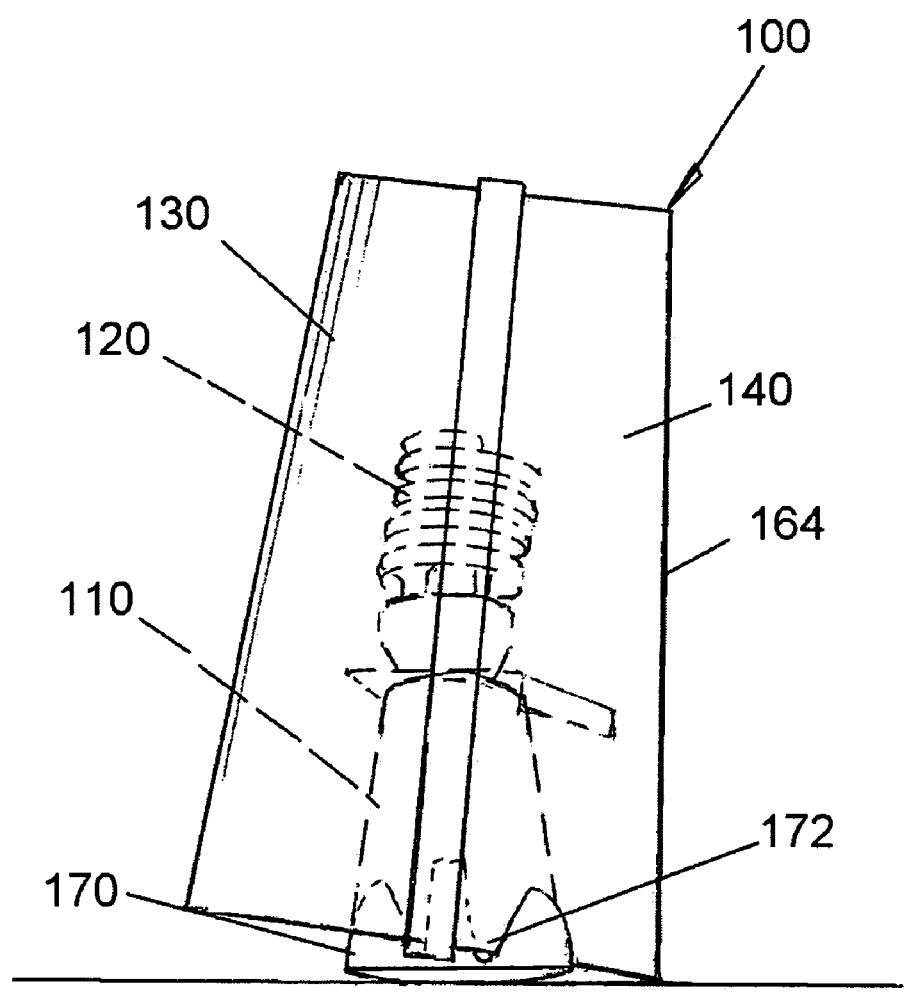
FIG. 14 is a side elevation of the further embodiment in one possible use position.

As shown in FIG. 14, the light in its use position can be tilted back and be supported against the lower corner of the central living hinge 164 and the pair of end caps 170 of the light assembly 112, which advantageously have slightly convex bottom surfaces for this purpose. FIG. 14 also better shows the slot 172 formed in the end cap 170 for engaging the lower edge of panel 140.

Figure 15:
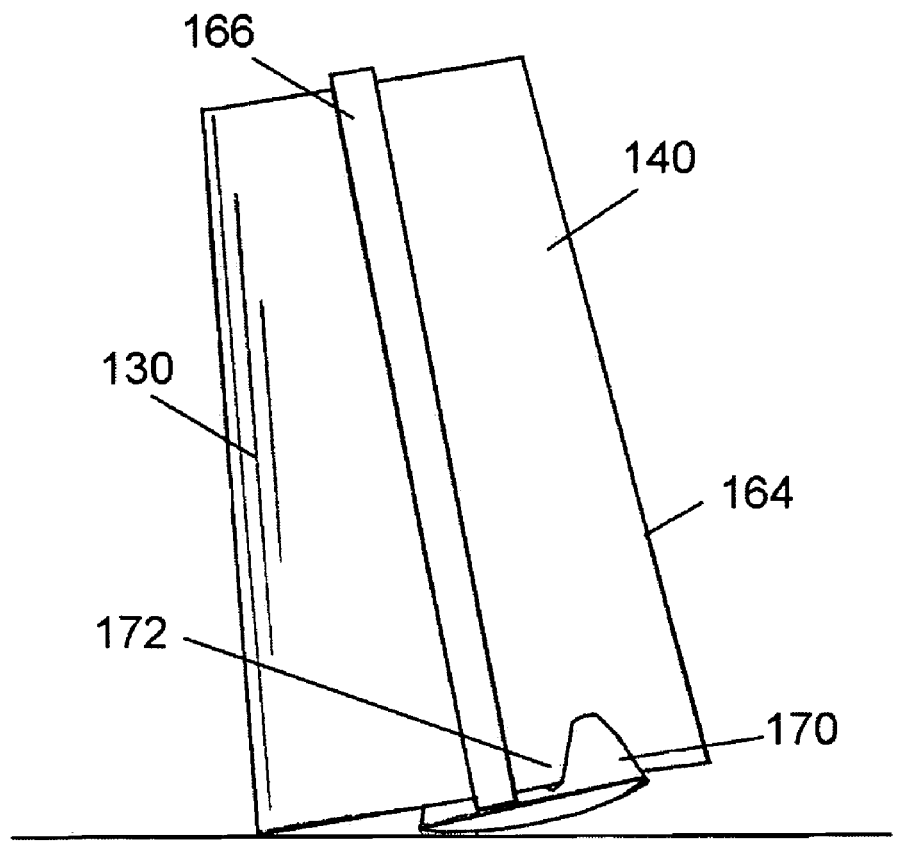
FIG. 15 is a side elevation of the further embodiment in another possible use position.

FIG. 15 shows a forwardly tilted position which is equally stable and directs illumination of light in a more downward direction. As with the embodiments of FIGS. 1–8, the embodiments of FIGS. 9–15 can used for lighting needed for imaging as well as general lighting and even to treat SAD by virtue of its high intensity, yet efficient, low heat and easy to store structure.

Figure 16:
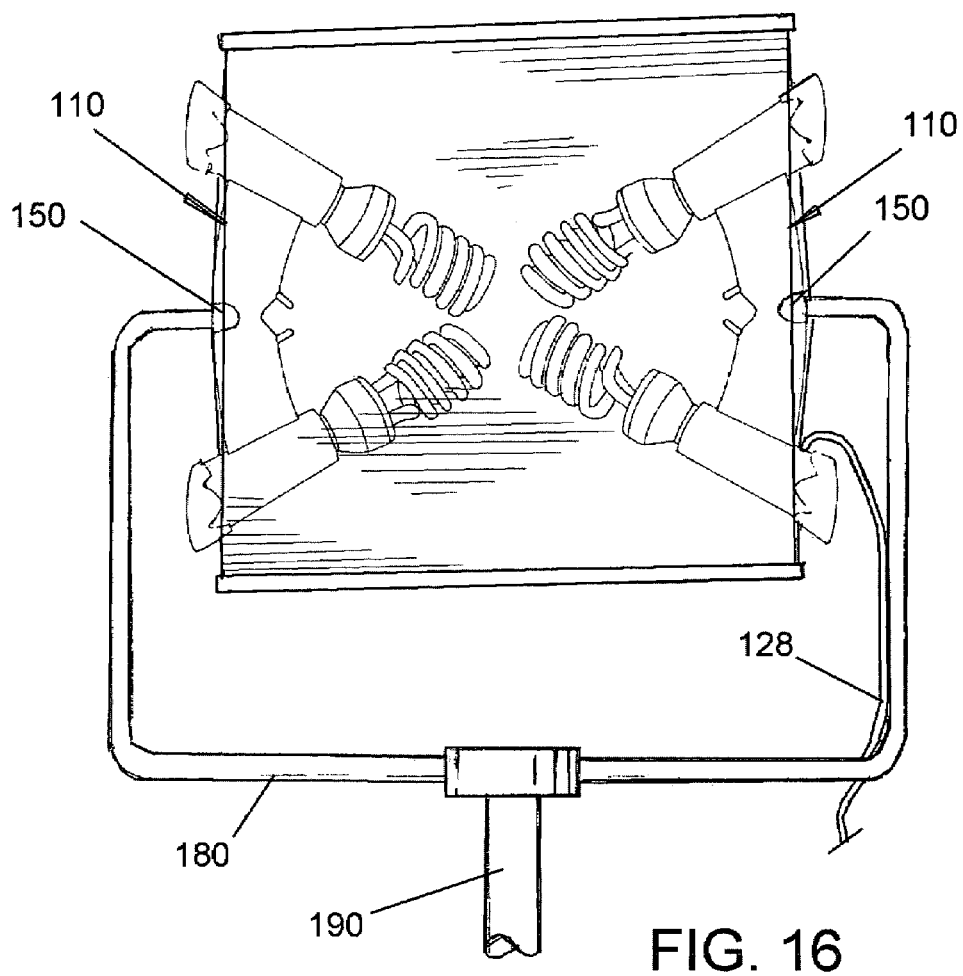
FIG. 16 is a front elevation of a variant of the further embodiment of the invention.

FIG. 16 shows an alternate embodiment where two light assemblies 110 are connected to opposite edges of a reflective rear panel with a small amount of additional size. In this embodiment, the enlargements 150 with threaded stand receptacles can engage a U-shaped support 180 connected to a stand 190 for supporting the light which now has four lamps and thus twice the illuminating capacity of the embodiment of FIG. 14.

It is advantageous to make the support panels 158 transparent and also relatively short across the panel 140 to reduce to a minimum of any shadow cast by the support panel onto the front panel 130 which is preferably translucent and white but may not be transparent.

Figure 18:
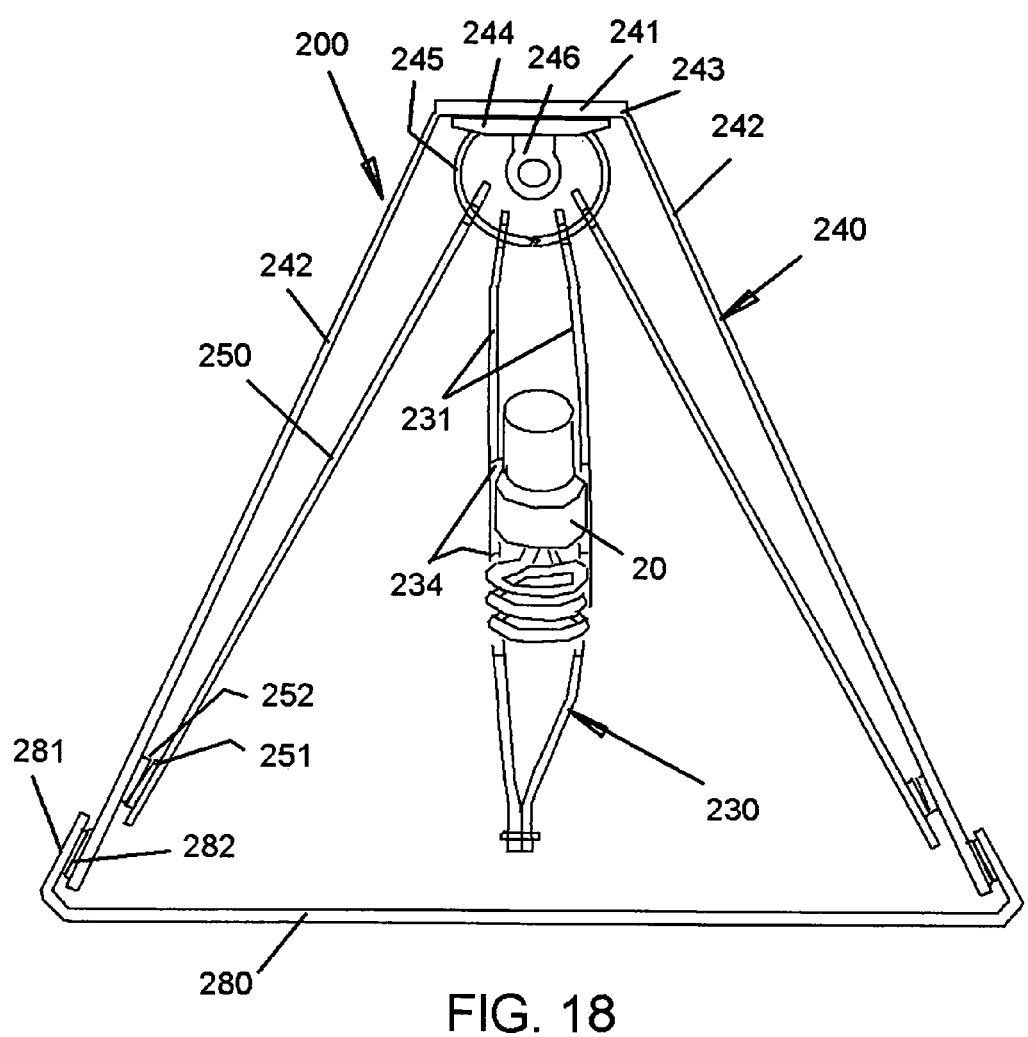
FIG. 18 is a top plan view of another embodiment of the invention.
Figure 19:
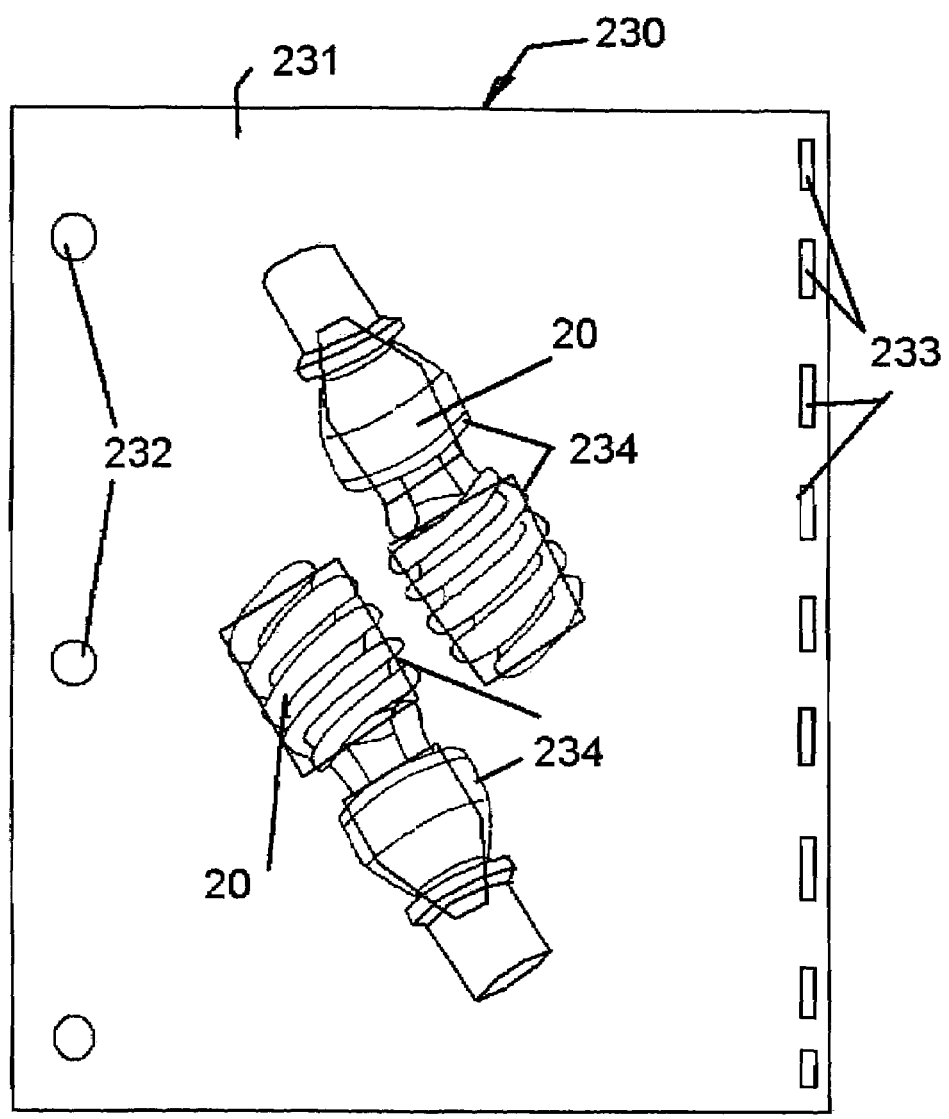
FIG. 19 is a side elevational view of the lights in a support panel of the embodiment of FIG. 18.

FIGS. 18 and 19 illustrate a still further embodiment of the invention comprising a collapsible light 200, assembled for use and in a use position. The light 200 includes a flexible, i.e. foldable light modifying panel assembly 240 forming the rear of the light and its main frame and support structure.

Referring to FIG. 18 which is a top plan view of the light 200, assembly 240 is advantageously in the form of a loose-leaf or three-hole binder having a spine or back panel 241 with opposite vertical edges connected to a pair of side panels 242 by living hinges 243. A ring holding rail 244 of know design holds a plurality of split rings 245 which can each be opened by pivoting an actuator 246 provided at each end of rail 245.

Opening rings 245 allows insertion of any number of light modifying panels or sheets of material having holes corresponding to the rings, and the rings can be closed to capture and connect the panels to the assembly 240. While a three-ring binder structure is illustrated, two or more rings can be used and the assembly 240 can be of any size. By making the side panels 242 rigid but hinged to the spine 241, the assembly is flexible and can be moved from the open or use position of FIG. 18, in which the assembly can be supported on any horizontal surface due to the spread angular placement of the side panels 242, to a storage position with the side panels substantially parallel and close to each other. In the storage position, any panels on rings 245 are either removed, or can simply stay on the rings and reside between side panels 242.

One of the panels that can be captured on rings 245, is a support panel assembly 230 of transparent or translucent panels 231 which carry therebetween one or more lamps or light sources 20.

As shown in FIG. 19, panels 231 of support panel assembly 230, each have three holes 232 for engaging rings 245, and their outer vertical edges are connected to each other, e.g. by stitching, staples or other fasteners 233. Alternatively, one large transparent or translucent panel that is folded in half can form panels 231, with the fold being at the location of the fasteners 233.

In either case, the panels 231 have aligned openings 234 that are much like the openings 32 of the embodiment of FIG. 1, for capturing lamps or light sources, such as coiled flourescent lamps 20 or any other type of lamp that is suitable for the invention. Power wires (not shown) are connected to the lamps to power them.

Returning to FIG. 18, the inner facing surfaces of side panels 242 can be provided with a light modifying material such as a shiny light reflecting coating surface or may be left plain and made of the same, commonly plastic, material of the rest of the side panels and spine. Other light modifying panels 250 with holes can also be captured on rings 245 on one or both sides of support panel assembly 230, for further modifying the light from lamps 20. Each panel 250 can have hook and loop or other fasteners 251 for connected to corresponding fasteners 252 on the facing surfaces of side panels 242 for fixing the position of each panel 250 in the collapsible light 200. Panels 250 can be clear color film to add a tint to the light, opaque light absorbing material to soften the light, reflective material to reflect the light or any other rigid or flexible material that in any way modifies the light from lamps 20, or even just insulates against heat from the lamps.

A further translucent or transparent panel assembly 280 can also be connected across the outer edges of side panels 242 for further softening, coloring or otherwise modifying the light from the lamp.

Assembly 280 has live hinges and side wings 281 with fasteners, e.g. hook and loop fasteners 282, for detachably connecting the assembly 280 to the side panels 242.

While specific embodiments of the invention have been shown and de-scribed in detail to illustrate the application of the principles of the invention, it will be understood that the invention may be embodied otherwise without departing from such principles.

What is claimed is:

1. A collapsible light comprising:
    a light modifying panel assembly having front and rear surfaces and opposite sides, the light modifying panel assembly being foldable between an open support position defining at least one support plane for support of the collapsible light on a horizontal surface, and a closed storage position;
    a transparent or translucent lamp support panel assembly connected at at least two spaced apart locations to the light modifying panel assembly, for supporting at least one lamp in front of the front surface and between the opposite sides of the light modifying panel assembly; and
    release means for releasably holding the light modifying panel assembly in the use position and for releasing the light modifying panel assembly so that the light modifying panel assembly can assume the closed storage position.

2. A collapsible light according to claim 1, including a further light modifying panel having opposite sides connected respectively to the opposite sides of the light modifying panel assembly.

3. A collapsible light according to claim 1, wherein, in the use position, the light modifying panel assembly has a concave shape that is one of a parabola, a "V" shape, a "U" shape, a "W" shape, and an arc.

4. A collapsible light according to claim 1, further comprising a fastener provided on at least a portion of a perimeter of one of the panel assemblies.

5. A collapsible light comprising:
a light modifying panel assembly having front and rear surfaces and opposite sides, the light modifying panel assembly being foldable between an open support position defining at least one support plane for support of the collapsible light on a horizontal surface, and a closed storage position;
a transparent or translucent lamp support panel assembly connected at at least two spaced apart locations to the light modifying panel assembly, for supporting at least one lamp in front of the front surface and between the opposite sides of the light modifying panel assembly;
a fastener provided on at least a portion of a perimeter of one of the panel assemblies; and
at least one effects panel connectable to the light modifying panel assembly with the fastener.

6. A collapsible light according to claim 5, wherein the at least one effects panel is a translucent diffuser panel.

7. A collapsible light according to claim 1, wherein the release means comprises buckle means.

8. A collapsible light according to claim 1, wherein the lamp support panel assembly comprises at least one support panel and an opening through the support panel for receiving at least part of a lamp supported by the lamp support panel assembly.

9. A collapsible light comprising:
a light modifying panel assembly having front and rear surfaces and opposite sides, the light modifying panel assembly being foldable between an open support position defining at least one support plane for support of the collapsible light on a horizontal surface, and a closed storage position;
a transparent or translucent lamp support panel assembly connected at at least two spaced apart locations to the light modifying panel assembly, for supporting at least one lamp in front of the front surface and between the opposite sides of the light modifying panel assembly; and
wherein the front surface of the light modifying panel assembly is reflective.

10. A collapsible light according to claim 9, including a further light modifying panel having opposite sides connected respectively to the opposite sides of the light modifying panel assembly.

11. A collapsible light according to claim 10, wherein the light modifying panel assembly and the lamp support panel assembly are shaped to tilt a lamp supported in the lamp support panel assembly.

12. A collapsible light according to claim 1, wherein the light modifying panel assembly contains at least one hinge for changing the shape of the light modifying panel assembly between the use and storage positions.

13. A collapsible light according to claim 1, wherein the lamp support panel assembly comprises a lamp support assembly including a socket portion for receiving a socket of at least one lamp, and a transparent support panel movably mounted to the light modifying panel assembly for engaging the lamp support assembly and for holding the collapsible light in its use position.

14. A collapsible light according to claim 1, wherein the light modifying panel assembly contains at least one hinge for changing the shape of the light modifying panel assembly between the use and storage positions and a spine for supporting at least two rings, the lamp support panel assembly having a hole for engaging each ring for supporting the lamp support panel assembly on the light modifying panel assembly.

15. A collapsible light according to claim 14, including a further light modifying panel having opposite sides connected respectively to the opposite sides of the light modifying panel assembly.

16. A collapsible light according to claim 14, including a further light modifying panel having at least two holes for engaging the rings of the light modifying panel assembly.

17. A collapsible light according to claim 14, wherein the lamp support panel assembly comprises a pair of transparent or translucent panels having a hole for engaging each ring for supporting the lamp support panel assembly on the light modifying panel assembly, and means for supporting at least one lamp between the transparent or translucent panels.

18. A collapsible light comprising:
a rear light modifying panel having front and rear surfaces and opposite sides, the rear panel being at least partly flexible and foldable between an open use position and a closed storage position;
a front light modifying panel having opposite sides connected respectively to the opposite sides of the rear panel and having front and rear surfaces and being at least partly flexible and foldable between an open use position at least partly spaced from the rear panel for defining a lamp space, and a closed storage position with the rear and front panels closer to each other;
release means connected to at least one of the rear and front panels for releasably holding the panels in the open use positions and for releasing the panels so that the panels can assume the closed storage positions; and
at least one lamp support panel connected to at least one of the front surface of the rear panel and the rear surface of the front panel, and having a use position for supporting at least one lamp in the lamp space in front of the rear panel, at the rear of the front panel and between the opposite sides of the rear and front panels, the support panel having storage position for permitting the rear and front panels to move to their closed storage positions.

19. A collapsible light according to claim 18, wherein, in the use positions, at least one of the rear and front panels has a concave shape that is one of a parabola, a "V" shape, a "U" shape, a "W" shape, and an arc shape.

20. A collapsible light according to claim 18, wherein the front surface of the rear panel is reflective.

21. A collapsible light according to claim 18, wherein at least one of the rear and front light modifying panels contain at least one hinge for changing the shape of the panel between the use and storage positions.

22. A collapsible light according to claim 18, including a socket assembly for receiving at least one lamp, the socket assembly being removably connected to at least one of the rear and front panels, the support panel being mounted to the rear panel at a location for engaging a lamp in the socket assembly for holding the rear and front panels in their use positions.

23. A collapsible light according to claim 22, wherein the support panel is connected by a hinge to the front surface of the rear panel.

24. A collapsible light according to claim 23, wherein the socket assembly includes at least one bottom cap for supporting the collapsible light, a socket portion connected to the bottom cap for receiving the socket of a lamp, and a scalloped slot area into which a lower edge of at least one of the rear and front panel are seated in the use positions.

25. A collapsible light according to claim 24, wherein the socket assembly includes two said bottom caps for supporting the collapsible light, two said socket portions connected to the bottom caps for receiving the sockets of two lamps, and two said a scalloped slot areas into which a lower edge of at least one of the rear and front panel are seated in the use positions, the socket assembly including a support bridge connected between the socket portions for supporting the socket portions at a spaced location from each other, the collapsible light including two said lamp support panels connected at spaced locations to the front surface of the rear panel each with a use position for supporting at least one lamp in each socket portion in the lamp space in front of the rear panel.

* * * * *

UNITED STATES PATENT AND TRADEMARK OFFICE
CERTIFICATE OF CORRECTION

PATENT NO. : 7,086,746 B2  
APPLICATION NO. : 10/872911  
DATED : August 8, 2006  
INVENTOR(S) : Gary Regester et al.

Page 1 of 1

It is certified that error appears in the above-identified patent and that said Letters Patent is hereby corrected as shown below:

On the title page item (76) add a second inventor as follows:

--David Conroy, 361 Parkside Avenue, Brooklyn, NY (US) 11226--

Signed and Sealed this

Fourteenth Day of November, 2006

JON W. DUDAS  
*Director of the United States Patent and Trademark Office*